United States Patent Office 2,694,227
Patented Nov. 16, 1954

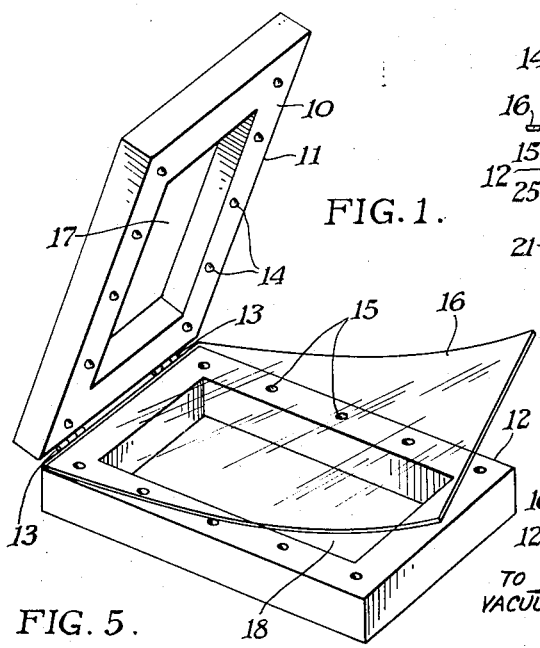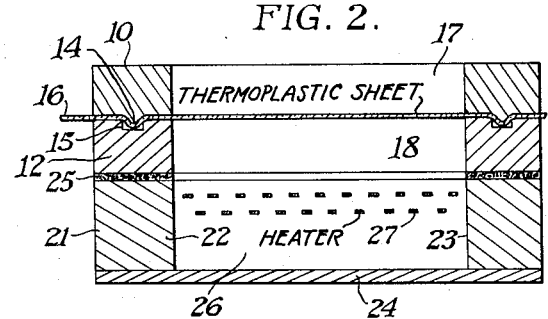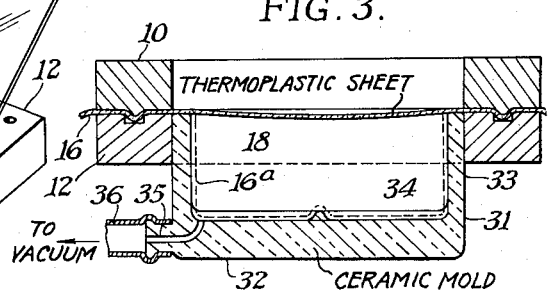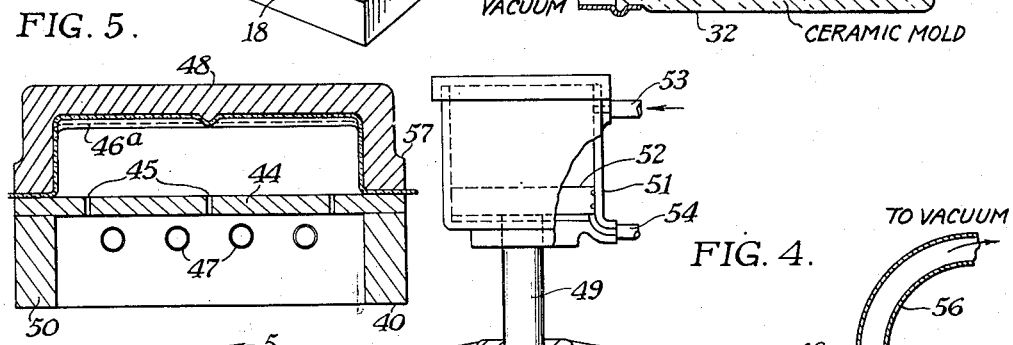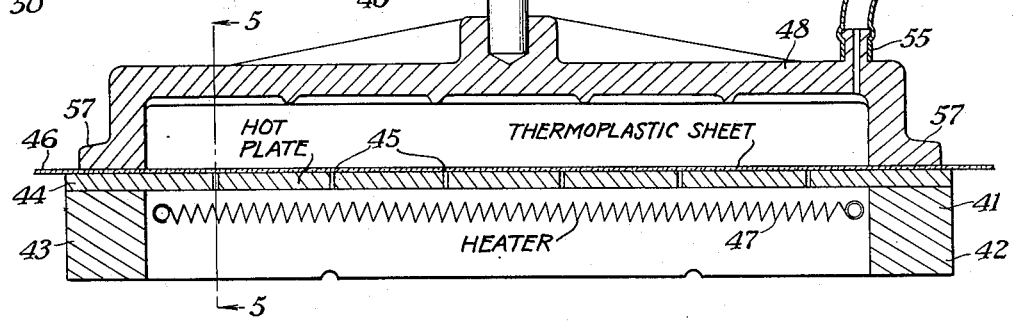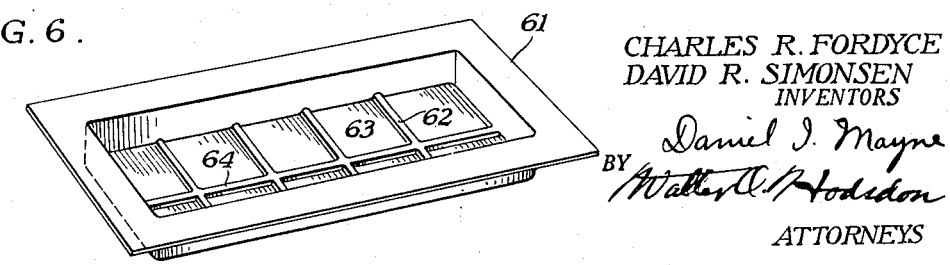

2,694,227

METHOD FOR FORMING HIGH ACETYL CONTENT CELLULOSE ACETATE SHEETS INTO SHAPED ARTICLES

Charles R. Fordyce and David R. Simonsen, Rochester, N. Y., assignors to Eastman Kodak Company, Rochester, N. Y., a corporation of New Jersey Application March 6, 1951, Serial No. 214,153

6 Claims. (Cl. 18—56)

This invention relates to a method of forming thermoplastic sheeting into shaped articles by the use of vacuum, and more particularly to a method which includes preheating high acetyl content cellulose acetate thermoplastic sheeting by direct contact with a hot surface and then vacuum drawing the thus heated sheet directly into a vacuum mold without otherwise removing the sheet from the hot surface.

An object of the present invention is to provide an improved method of forming cellulose acetate thermoplastic sheets of relatively high acetyl content into shaped articles by vacuum forming.

Another object of the invention is to provide an improved method of heating and vacuum forming cellulose acetate thermoplastic sheets of relatively high acetyl content into shaped articles which eliminates costly and time-consuming operations as well as operations which impair the efficiency of the method.

Still another object of the invention is to provide an improved method of heating and vacuum forming transparent cellulose acetate sheeting having an acetyl content of at least 42.5% and a plasticizer content of at least 15 parts per 100 parts of cellulose acetate.

The invention will be further understood by reference to the following detailed description and accompanying drawings in which Fig. 1 is a view in perspective of a plastic sheet and a clamping frame for clamping a thermoplastic sheet in a flat position.

Fig. 2 is a cross-sectional view showing the frame and sheet of Fig. 1 in clamped relationship and placed above a heating unit, also shown in cross-section;

Fig. 3 is a cross-sectional view of the heated framed sheet positioned over a suction mold;

(It should be understood that Figs. 1 to 3 illustrate the prior art methods of vacuum forming ordinary types of thermoplastic sheeting and form no part of the instant invention.)

Fig. 4 is a view partly in section of a heating unit and vertically movable vacuum mold showing the thermoplastic sheet positioned in flat contact with the flat surface of the heating unit and held thereagainst in vacuum molding position by the mold;

Fig. 5 is a cross-sectional view taken on the lines 5—5 of Fig. 4 showing the sheet drawn up into the mold by the differential pressure created by the vacuum; and Fig. 6 is a view in perspective of the article which may be formed in accordance with the invention in the mold illustrated in Figs. 4 and 5.

The advantageous features of the present invention can perhaps be best described by comparison with a typical method embodying the principles of the prior art vacuum molding techniques. Figs. 1, 2 and 3 illustrate the fundamentals of vacuum forming ordinary thermoplastic sheeting which have been known to the art for many years. Referring to Fig. 1 there is shown a sheet clamping frame 10 made of wood comprising rectangular frame members 11 and 12 which are hinged at 13. The frames are in register and pins 14 on the upper frame member 11 fit into holes 15 in the lower frame member 12 when in clamping or closed position. A transparent thermoplastic sheet 16 is shown between members 11 and 12 and in position to be clamped thereby. The rectangular spaces 17 and 18 which are defined respectively by frame members 11 and 12 are also in register when the frame clamp 10 is in clamping position, as shown in Fig. 2.

Referring to Fig. 2 there is shown a heating unit 21 having rectangular boxlike shape generally corresponding in size to clamping frame 10. The side walls of the heating unit 21 are shown at 22 and 23 and the bottom at 24. The upper flat surfaces of the side walls and end walls, not shown, are covered by a heat resistant layer 25 such as sheet rock. The box 21 may be made of sheet rock or other heat resisting material. In the hollow space 26 within the box are positioned heating elements 27 which are suitably connected to a power source, not shown. The clamped sheet is positioned above the heating unit 21 as shown in the drawing with space 18 in register with space 26. Heat is thus applied to sheet 16 until it becomes soft and rubbery and tends to sag somewhat. The operator then quickly transfers the framed sheet 16 to the position shown in Fig. 3. As shown in Fig. 3 the framed sheet is placed over a rectangular box-shaped vacuum mold 31 comprising a bottom 32, side walls 33 and end walls, not shown. This mold is of the same shape as frame 10 but of dimensions which will fit inside the frame 10. It can be of a shape and design to produce a molded article such as shown in Fig. 6. The sheet 16 thus covers the space 34 of the mold 31. A conduit 35 is positioned through the wall of mold 31, and can be connected to a vacuum pump, not shown, by hose 36. As soon as the sheet 16 covers the mold the vacuum line is opened to the vacuum pump, not shown, and the sheet is drawn into the mold 31 as shown at 16a. The formed sheet loses its heat rapidly and in a few seconds the frame 10 can be raised from the mold 31 and the molded article corresponding in shape to that shown in Fig. 6 can be separated therefrom.

In this prior art process described in connection with Figs. 1, 2 and 3, it will be seen that the sheet must be handled several times before the product is obtained. First it must be positioned in the clamp and the clamp closed, secondly it must be transferred to the heating unit, and third after being heated it must be transferred to the vacuum mold for forming, and finally the clamping frame must be opened and the formed article removed. All these steps are time consuming and the sagging of the sheet, after being heated in the clamping frame, also causes the formed article to be slightly thinner in its central portions than the rest of the article. If the article being molded is a cover for a box, this thin spot is often evident when one picks up the box, it tending to spring in under slight pressure. When transferring the heated sheet from the heater to the mold, it sometimes happens that the sheet cools below the optimum forming temperature and "blushing" may result in the molded article.

These various disadvantages of such prior art methods are eliminated by the sheet forming method constituting our present invention, which moreover provides several advantages not present in such prior art methods. Our method includes the direct contact heating of cellulose acetate sheet of particular acetyl content described hereinafter, on a flat heated surface, and the vacuum drawing of the thus heated sheet directly from the hot surface up into a vacuum mold which is positioned in substantial airtight relationship with the upper perimeter surface of the hot sheet. This novel method eliminates sagging of the sheet and the disadvantageous use of frames and accompanying multiple handling of the sheet as described above in the connection with the prior art methods.

We have found that our novel process may be advantageously carried out provided the sheet is composed of cellulose acetate having greater than 42.5% acetyl content and also contains at least 15 parts of plasticizer for 100 parts of high acetyl cellulose acetate. We have found if the acetyl content is below this minimum, the heated sheet will stick to hot metal surfaces and make it impossible to draw it away from the heated surface by vacuum. If the plasticizer content of such an acetate is less than 15 parts, excessive amounts of heat are required to permit forming and the latitude of the forming operation is very limited. Plasticizers which may be used are methyl, ethyl, or butyl phthalates, methoxy ethyl phthalate, triphenyl phosphate, glycerine triacetate, or mixtures of these plasticizers. Such compositions are shown in further detail in the following examples.

It is interesting to note that other single and mixed cellulose organic acid esters cannot be formed in accordance with our invention since they will stick to the hot surface and will not draw up into the mold in an effective manner.

Referring to Fig. 4 there is shown apparatus suitable for carrying out our improved vacuum process. In this figure a heating unit 41 is shown comprising end walls 42 and 43 and a flat heating plate 44 supported thereby and attached thereto by means not shown. A plurality of heating coils 47 are positioned beneath plate 44 and supply heat thereto. The side walls 40 and 50 of the heating unit are shown in Fig. 5. The high acetyl content acetate sheet 46 to be vacuum formed is shown laying on hot plate 44. The vacuum mold 48 which is of a design suitable to produce the formed tray 61 shown in Fig. 6, is positioned above the hot plate 44 and is movable in a vertical direction by piston rod 49 which is actuated by piston 52 which moves in cylinder 51. Fluid for moving the piston is alternately introduced through pipes 53 and 54. It will be understood that other methods of positioning the mold in contact with the sheet can be used instead of the piston arrangement. Suction is applied in the mold cavity through conduit 55 in the upper wall of the mold 48 and flexible hose 56 which is attached to a vacuum pump, not shown. As shown in Fig. 4 the flat flanges 57 around the perimeter of mold 48 hold and press down the high acetyl content acetate sheet into substantially airtight relationship with the hot plate 44 leaving the center portion of the sheet free to be forced up into the mold and take the shape thereof when heated to plasticity and when the vacuum line is opened. Air holes 45 permit air to pass through the hot plate and cooperate with the suction to force the sheet into the mold. Referring to Fig. 5 it will be seen that the operation has been completed and the sheet 46a has taken the contour of the mold. The sheet is then permitted to cool and the mold having the formed sheet therein is retracted from the hot plate and the molded article separated manually from the mold. The formed article 61 is shown in Fig. 6 and has ribs 62 and 64 raised above the bottom portion 63. It will be understood by those skilled in this art, that other female molds of different internal shapes and designs may be employed in accordance with our invention in place of that shown in the drawings. If required, additional vacuum conduits may be employed at the deep draws of the mold as is customary in the prior art.

*Example 1*

A cellulose acetate sheet of .010 inch thickness made from cellulose acetate of 43.7% acetyl content and containing as plasticizers a mixture of 15 parts of triphenyl phosphate and 15 parts methoxy ethyl phthalate for each 100 parts of cellulose acetate was placed upon the flat hot plate 44 of the vacuum forming apparatus shown in Fig. 4, which was maintained at 375° F. The sheet became moldable in from 3 to 10 seconds. The forming mold was lowered upon the sheet and held tightly in position while suction was applied to the mold cavity. The heated cellulose acetate sheet was immediately drawn from the hot metal surface up into contact with the cool mold, which was then raised by the piston and the formed article 61 taken from the mold. The process will also operate if the mold is lowered onto the sheet before heating is begun or while it is in progress.

*Example 2*

A cellulose acetate sheet, .010 inch thick, made from cellulose acetate of 42.8% acetyl content and containing as plasticizer 30 parts of triphenyl phosphate for each 100 parts of cellulose acetate was treated according to the procedure described in Example 1, excepting that the hot plate was maintained at a temperature of 400° F. The heated plastic sheeting formed readily into the mold cavity upon application of vacuum and was removed from the mold as described in Example 1.

*Example 3*

Cellulose acetate sheeting of .0075 inch thickness, made from cellulose acetate of 43.4% acetyl content and containing as plasticizer 15 parts of triphenyl phosphate for each 100 parts of cellulose acetate was formed as described in Example 1 using a hot plate temperature of 400° F. The behavior of the cellulose acetate sheet was similar to that in Example 2 excepting that a slightly longer heating period was required before application of the vacuum, and it was necessary that the vacuum be strong enough to form the heated sheet into the cold mold rather quickly because of the tendency of the sheet to resist further forming as soon as it began to cool.

*Example 4*

Forming operations as described above were carried out with the following sheeting compositions:

| Acetyl Content | Plasticizer | Parts of Plasticizer for 100 parts of acetate | Forming Temperature, °F. | Time of Heating, seconds |
|---|---|---|---|---|
| 43.5% | Butyl Phthalate | 30 | 380 | 10 |
| 43.5% | Methyl Phthalate | 20 | 375 | 12 |
| 43.5% | Methoxy ethyl Phthalate | 25 | 350 | 14 |

In all of these operations the heated cellulose acetate sheet could be formed into the mold by application of vacuum and showed no tendency to adhere to the hot metal surface.

In application of this sheet forming operation we prefer to use plasticizer contents of 25–30 parts for each 100 parts of cellulose acetate, although for certain applications, such as those in which it is desirable to have a rigid product, it may be preferable to use lower plasticizer concentrations.

As indicated in the example an acetate sheet having an acetyl content of 42.8% to 43.7% can be employed in our process.

With highly compatible plasticizer such as methoxy ethyl phthalate or butyl phthalate, it is possible to form softer compositions containing as high as 45 parts of plasticizer. In general with such high acetyl acetate 30 parts of plasticizer to 100 parts acetate is the optimum upper limit.

Instead of removing the formed article from the mold manually, it could be forced therefrom by blowing air under moderate pressure through conduit 56. If desired, provision for positively cooling or heating the mold could be employed as is known in the art.

The vacuum pressure employed may be approximately 5 to 25 inches of mercury. Depending on the composition of the sheet, the time of heating may be within the range of 5–20 seconds. In normal operation the hot plate will be maintained at the desired temperature and the sheets laid thereon and the mold then closed. Of course, the sheet could be held against the hot plate by the mold before heating, if so desired.

What we claim and desire to secure by Letters Patent of the United States is:

1. The method of molding a thermoplastic sheet composed of cellulose acetate of an acetyl content within the range of 42.5 to 43.7% and a plasticizer content of from 15 to 30 parts per 100 parts of said acetate into a molded article, which comprises heating the sheet while in a flat plane to plasticity, at which state it tends to sag due to gravity, preventing any sagging of the sheet by supporting the sheet over its entire surface in said flat plane, pressing a mold having a cavity therein against said heated and supported sheet without moving the sheet from said plane and the place of heating, the mold cavity facing the heated sheet, and drawing the heated sheet into the mold cavity by suction.

2. The method of claim 1 in which the thermoplastic sheet is composed of 100 parts cellulose acetate of an acetyl content of 42.5% and a plasticizer content of 15 parts of triphenyl phosphate.

3. The method of claim 1 in which the thermoplastic sheet is composed of 100 parts cellulose acetate of an acetyl content of 43.7% and a plasticizer content of 25 parts of triphenyl phosphate 4. The method of claim 1 in which the thermoplastic sheet is composed of 100 parts cellulose acetate of an acetyl content of 42.8% and a plasticizer content of 30 parts of triphenyl phosphate.

5. The method of claim 1 in which the thermoplastic sheet is composed of 100 parts cellulose acetate of an acetyl content of 43.5% and a plasticizer content of 30 parts of butyl phthalate.

6. The method of claim 1 in which the thermoplastic sheet is composed of 100 parts cellulose acetate of an acetyl content of 43.5% and a plasticizer content of 25 parts of methoxy ethyl phthalate.

References Cited in the file of this patent

UNITED STATES PATENTS

| Number | Name | Date |
|---|---|---|
| Re. 23,171 | Borkland | Nov. 29, 1949 |
| 597,929 | Burns | Jan. 25, 1898 |
| 2,305,433 | Kyle | Dec. 15, 1942 |
| 2,377,946 | Leary | June 12, 1945 |
| 2,493,439 | Braund | Jan. 3, 1950 |
| 2,514,028 | Cloud | July 4, 1950 |
| 2,531,540 | Smith | Nov. 28, 1950 |